United States Patent [19]
Feldtkeller

[11] Patent Number: 6,111,379
[45] Date of Patent: Aug. 29, 2000

[54] CIRCUIT CONFIGURATION FOR DRIVING AN ELECTRICAL DRIVE UNIT

[75] Inventor: Martin Feldtkeller, München, Germany

[73] Assignee: Siemens Aktiengesellschaft, Munich, Germany

[21] Appl. No.: 09/207,123

[22] Filed: Dec. 7, 1998

[30] Foreign Application Priority Data

Dec. 5, 1997 [DE] Germany .......................... 197 54 126

[51] Int. Cl.[7] .................................................. G05B 5/00
[52] U.S. Cl. ......................... 318/471; 318/434; 318/472; 318/474; 361/23
[58] Field of Search ................... 318/430–470, 318/471, 472, 473, 474, 811, 801; 310/220; 377/20, 25; 128/419 PG; 324/158 MG, 83 R; 361/20–35, 51, 115

[56] References Cited

U.S. PATENT DOCUMENTS

| | | | |
|---|---|---|---|
| 4,633,491 | 12/1986 | Kuhnel | 377/20 |
| 4,688,573 | 8/1987 | Alt | 128/419 PG |
| 5,003,252 | 3/1991 | Nystrom | 324/158 MG |
| 5,051,670 | 9/1991 | De Piola | 318/434 |
| 5,187,631 | 2/1993 | Baylac et al. | 361/94 |
| 5,189,412 | 2/1993 | Mehta et al. | 340/825.22 |
| 5,309,345 | 5/1994 | Nakamura et al. | 363/41 |
| 5,448,143 | 9/1995 | Pecone | 318/434 |
| 5,604,654 | 2/1997 | Wille et al. | 361/23 |
| 5,659,235 | 8/1997 | Yamada et al. | 318/801 |
| 5,854,545 | 12/1998 | Eibel | 318/369 |
| 5,949,173 | 9/1999 | Wille et al. | 310/220 |

FOREIGN PATENT DOCUMENTS 0 578 958 B1  11/1996  European Pat. Off. .

*Primary Examiner*—Paul Ip
*Attorney, Agent, or Firm*—Herbert L. Lerner; Laurence A. Greenberg; Werner H. Stemer

[57] ABSTRACT

The circuit configuration is used to drive an electrical drive unit. The circuit has a voltage source and a control circuit for voltage commutation connected between the voltage source and the electrical drive unit. In addition, the circuit includes a temperature evaluation circuit that monitors the temperature of the control circuit. The temperature evaluation circuit uses the motor current of the electrical drive unit to determine the housing temperature of the power switch which has the greatest load.

11 Claims, 4 Drawing Sheets

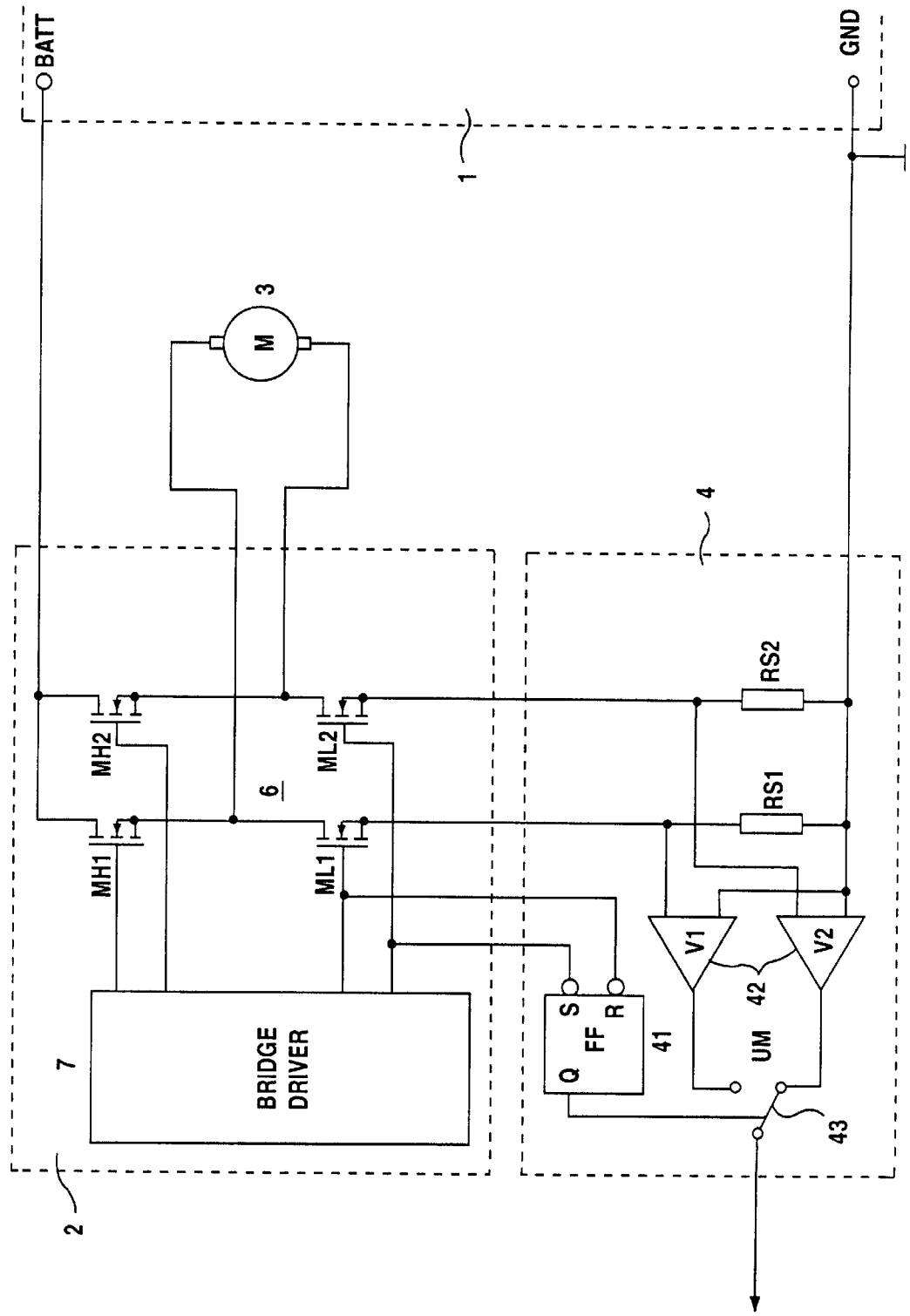

CIRCUIT CONFIGURATION FOR DRIVING AN ELECTRICAL DRIVE UNIT

BACKGROUND OF THE INVENTION

Field of the Invention

The invention relates to a circuit configuration for driving an electrical drive unit in a motor vehicle having a DC voltage source and having a control circuit in the form of a current bridge and a bridge driver for voltage commutation, whereby the control circuit is located between the DC voltage source and the electrical drive unit.

Such circuit configurations with control circuits used for voltage commutation are known in the field of motor vehicle electronics. They comprise a current bridge constructed using MOSFETs, for example. The MOSFETs are suitably addressed by a bridge driver, so that the direction of rotation of a DC motor connected to the current bridge can be reversed. Owing to heating of the power switches, caused by large motor currents, on the one hand as a result of ohmic on-state losses and on the other hand as a result of switching losses during pulsed operation, it must be ensured that the power switches do not overheat on account of continuous operation, as this could lead to destruction. For this reason, it is necessary to monitor the temperature of the power switches.

Various possibilities have become known in the art with regard to the design of temperature monitoring circuits.

In monolithic integrated circuits, there is close thermal coupling between the bridge driver and the bridge circuit. It is therefore sufficient to mount a temperature sensor on the bridge driver. The temperature of the power switches is then returned as an approximation by the temperature sensor. Monolithic integrated circuits can be produced only up to a maximum of 10 A, however. This current is not sufficient for many applications.

If the bridge circuit is realized discretely, a temperature sensor can be mounted on each power switch. Methods exist for temperature monitoring e.g. using so-called chip-on-chip assembly of a temperature sensor on a power transistor, or there are intelligent power transistors having integrated temperature detection. However, one disadvantage is that the evaluation circuit which indicates whether or not a limit temperature has been reached is usually only digital. This may result in its operation possibly being terminated immediately in the event of thermal overloading. This is generally not desirable, however. Furthermore, this solution is complex and expensive.

European patent No. EP 0 578 958 B1 discloses an overload protection circuit for a transistor. That invention is based on recognition of the fact that, in closed-loop operation, the current through the transistor is constant and hence the power loss is proportional to the voltage drop across the transistor. If the voltage drop is supplied to an integrator whose time constant is matched to the thermal time constant of the transistor, the voltage at the integrator is a measure of the energy loss or the temperature of the transistor. The integrator voltage is compared with a reference value and, if this reference value is exceeded, is used as a turn-off criterion for the transistor, for example. Temperature monitoring using this method requires every transistor to be monitored. This is complex and expensive.

SUMMARY OF THE INVENTION

It is accordingly an object of the invention to provide a circuit for driving an electrical drive unit, which overcomes the above-mentioned disadvantages of the heretofore-known devices and methods of this general type and which is improved in such a way that the temperature of the power switches of a control circuit for an electrical drive can be reliably monitored simply and with low complexity, including for large rated currents.

With the foregoing and other objects in view there is provided, in accordance with the invention, a circuit configuration for driving an electrical drive unit, comprising:

a control circuit through which a current is supplied to an electrical drive unit, the control circuit having a current bridge and a bridge driver connected to the current bridge; and a temperature evaluation circuit connected to receive the current supplied to the electrical drive unit, the temperature evaluation circuit determining from the current supplied to the electrical drive unit a temperature of the current bridge and outputting a temperature-dependent output signal.

In accordance with an added feature of the invention, an RC filter is provided with a time constant equal to a thermal time constant of the control circuit. The temperature evaluation circuit is connected to receive a motor current value of the electrical drive unit, and the temperature-dependent output signal is formed by squaring the motor current value to form a square of the motor current, integrating the square of the motor current with the RC filter to form an integral, and adding to the integral a variable which is dependent on an ambient temperature.

In accordance with an additional feature of the invention, the control circuit comprises a plurality of current bridges and a driver for driving the plurality of current bridges.

In accordance with another feature of the invention, the control circuit is a monolithic integrated circuit.

In accordance with a preferred embodiment of the invention, the electrical drive unit is a DC motor or an asynchronous motor.

In accordance with again another feature of the invention, a temperature measuring device is provided for measuring an ambient temperature.

In accordance with again a further feature of the invention, the temperature measuring device is included in the bridge driver.

In accordance with a concomitant feature of the invention, the temperature evaluation circuit is a monolithically integrated circuit.

In other words, the circuit configuration according to the invention has a temperature evaluation circuit which uses the current flowing through the electrical drive unit to determine the absolute temperature of the power switch having the greatest load in the control circuit. According to the invention, the variable formed from the square of the motor current value is integrated using an RC filter whose time constant is the same as the thermal time constant of the bridge circuit. The voltage waveform at the output of the RC filter then corresponds approximately to the waveform of the housing temperature of the power switch having the greatest load. For an absolute measure of the highest housing temperature of one of the power switches in the bridge circuit, a signal derived from the temperature of the driver circuit is added upstream or downstream of the RC filter. The signal corresponds approximately to the ambient temperature. In the event of a first preset threshold temperature being exceeded, the signal determined in this way can be used to reduce all functions to a minimum required extent in order to save on power loss. In the event of a second preset threshold temperature being exceeded, the bridge circuit can be switched off completely, for example. With thermal coupling between the power switches and the bridge driver and addition of the signals downstream of the RC filter, the RC filter needs to be dimensioned in accordance with the propagation time for the thermal coupling of the power switches and the bridge driver.

One advantage of the circuit configuration according to the invention is that, for determining the temperature of the power switches, it is not necessary to monitor all the power switches in the bridge circuit, rather it is sufficient to use the motor current as the signal for the temperature evaluation circuit. As the motor current is detected anyway for control reasons, temperature evaluation can be realized inexpensively.

A characterizing feature of the circuit configuration for driving an electrical drive unit having a temperature evaluation circuit for determining the temperature of the power switch having the greatest load is that, instead of using one or more temperature sensors, an RC filter is used whose time constant is the same as the thermal time constant of the control circuit. The signal present at the output of the RC filter is a measure of the temperature waveform for the housing temperature of the power switch having the greatest load. An advantage of using an RC filter as compared with a temperature sensor is the low cost.

A further advantage of the temperature evaluation circuit according to the invention is that the outlay for temperature evaluation is independent of the number of power switches used. If the current bridge comprises six power switches instead of four power switches, then an asynchronous motor can be used instead of a DC motor. An asynchronous motor affords advantages in terms of cost and weight. In order for the motor current to be detected correctly, a motor current detection device needs to be installed in each current path in this case, each current value being squared and the sum of the squares being used as a measure of the power loss which is supplied to an RC filter.

If the motor current does not exceed a current of 10 A, the control circuit can be designed as a monolithic integrated circuit. A monolithic integrated circuit has advantages in terms of space and cost as compared with a circuit of discrete design.

In consideration of the fact that the drive unit is normally rotating and therefore, averaged over time, all the half bridges of the bridge circuit are loaded to the same extent, it is conceivable that it is also sufficient to detect and evaluate one current path using a motor current detection device, in order thus to obtain a measure of the heating of the entire bridge circuit.

The DC voltage source of the circuit configuration for driving an electrical drive unit can comprise a battery, an accumulator or at least one solar cell. An AC voltage source having a downstream rectifier is also conceivable. An advantage of the available options is that, depending on the boundary condition, it is possible to use a suitable or currently available voltage supply.

A further advantage of the circuit configuration according to the invention is that the temperature evaluation circuit can be designed as a monolithic integrated circuit. As the bridge driver—irrespective of whether the control circuit is realized as a monolithic integrated circuit or as a circuit of discrete design—is always in integrated form, the temperature evaluation circuit can also be integrated in the integrated circuit of the bridge driver. This design is inexpensive and space saving. Only the RC filter is not integrated in this circuit as well, but rather is of discrete design.

In accordance with a further feature of the invention, the motor current of the electrical drive unit is detected with a motor current detection device, the motor current detection device includes resistors connected in the bridge paths of the current bridge. In other words, the motor current is detected with reference to ground by means of the resistors in the bridge paths of the current bridge, by means of amplifiers, a flipflop and a changeover switch. The advantage is that the motor current detection circuit can be designed as an integrated circuit. This circuit can then be produced together with the temperature evaluation circuit and the bridge driver, for example. This affords advantages in terms of cost and space.

With the above and other objects in view there is also provided, in accordance with the invention, a method of monitoring a temperature of power switches in a current bridge driving an electrical drive unit. The method comprises:

determining a motor current value of an electrical drive unit;

squaring the motor current value;

integrating the squared motor current value obtained in the squaring step and forming an integral; and adding, to the integral, a variable that is dependent on an ambient temperature.

The output signal thus obtained is supplied to an evaluation unit for evaluation and further processing.

Other features which are considered as characteristic for the invention are set forth in the appended claims.

Although the invention is illustrated and described herein as embodied in a circuit configuration for driving an electrical drive unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a schematic circuit diagram of an advantageous refinement of the motor current detection circuit for a configuration with a DC motor.

DESCRIPTION OF THE PREFERRED EMBODIMENTS

Figure 1:
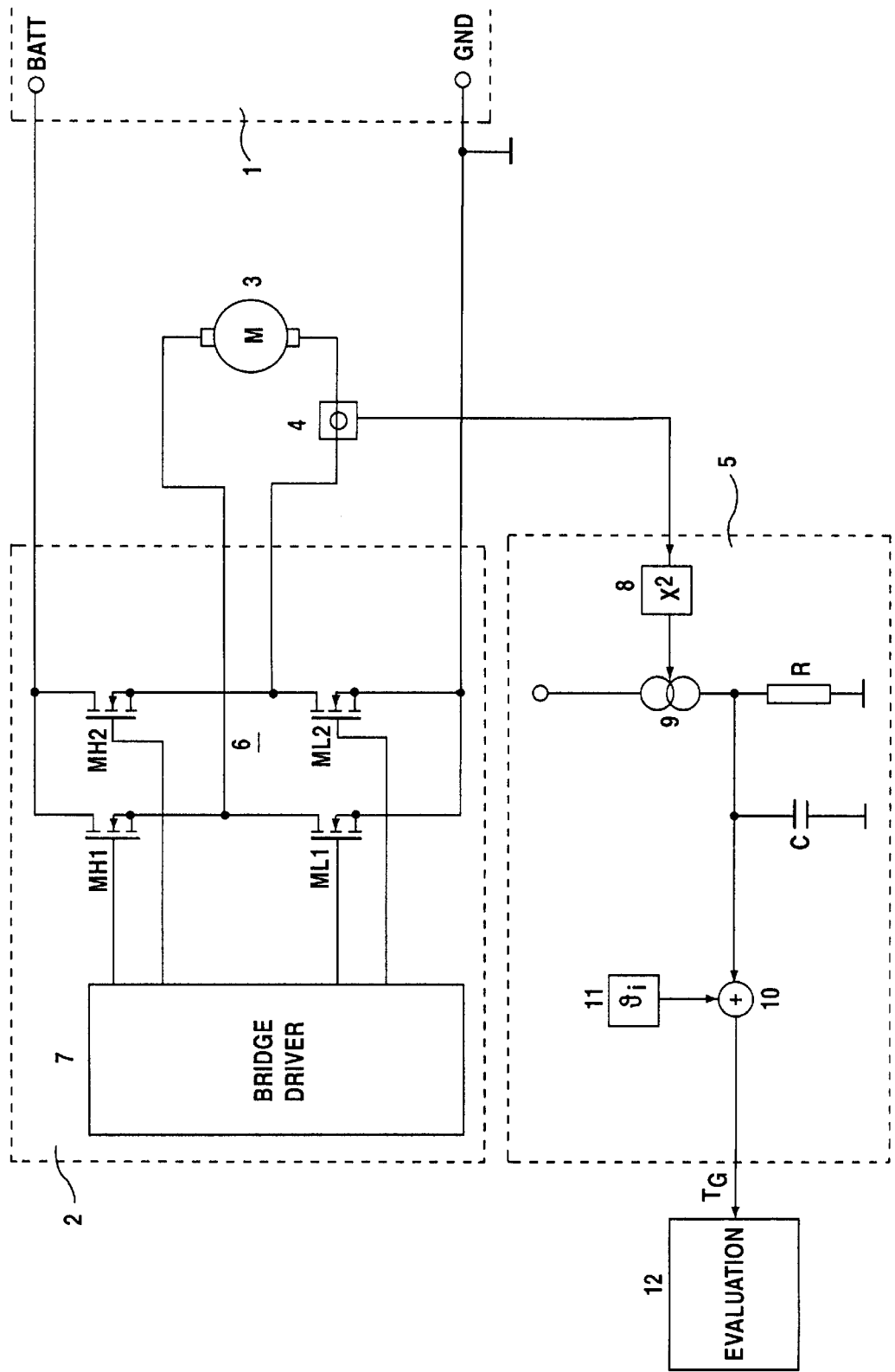
FIG. 1 is a schematic circuit diagram of the invention with a DC motor.

Referring now to the figures of the drawing in detail and first, particularly, to FIG. 1 thereof, there is seen a circuit configuration for driving an electrical drive unit 3. There is provided a voltage source 1 and a control circuit 2 for voltage commutation which comprises a current bridge 6 and a bridge driver 7. The control circuit 2 is connected between the voltage source 1 and the electrical drive unit 3. In addition, the circuit configuration comprises a motor current detection device 4 which, as shown in FIG. 1, is connected between a connection of the electrical drive unit 3 and a point of symmetry between two power switches of the current bridge 6. The motor current value is supplied to a temperature evaluation circuit 5. The power switches of the current bridge 6 comprise four MOSFETs MH1, MH2, C1, C2 in FIG. 1. The power switches may also be bipolar transistors or other power switches, however. The voltage source 1 in FIG. 1 is a DC voltage source in the form of a battery having a positive pole and a negative pole, but it may also be an accumulator, at least one solar cell or an AC voltage source having a downstream rectifier. The electrical drive unit 3 is a DC motor in FIG. 1. The positive pole of the voltage source 1 is connected to the drain connection of a first MOSFET MH1 and to the drain connection of a second MOSFET MH2. The source connection of the first MOSFET MH1 is connected to one connection of the electrical drive unit 3 and to the drain connection of a third MOSFET ML1. The source terminal of the second MOSFET MH2 is connected to the other connection of the electrical drive unit 3 and to the drain connection of a fourth MOSFET ML2. The source connection of the third MOSFET ML1 and the source connection of the fourth MOSFET ML2 are connected to the negative pole of the voltage source 1. The gate connections of the first, second, third and fourth MOSFETs MH1, MH2, ML1, ML2 are connected to a bridge driver 7. A motor current detection device 4 is connected between the drain connection of the fourth MOSFET ML2 and the connection of the electrical drive unit 3.

The output of the motor current detection device 4 is connected to the input of a squarer 8. The output of the squarer 8 serves as input for a controlled current source 9. The output of the controlled current source 9 is connected to a resistor R and a capacitor C. The resistor R and the capacitor C form an integrator element whose output forms a summand for an adder 10. The second summand is formed by a temperature measuring device 11 which has close thermal coupling with the bridge driver 7 of the control circuit 2. The output of the adder 10 is connected to an evaluation circuit 12, for example, and constitutes the input signal thereof. The evaluation circuit 12 is not described further.

The voltage source 1 provides an operating voltage which is used to operate the current bridge 6 comprising the first, second, third and fourth MOSFETs MH1, MH2, ML1, ML2. In this arrangement, the control circuit 2 may be designed as a monolithic integrated circuit containing the bridge driver 7 and the current bridge 6. For rated currents larger than 10 A, however, the power switches of the current bridge 6 are intended to be of discrete design. The bridge driver 7 drives the gates of the power switches in the current bridge 6 in such a way that the direction of rotation of the electrical drive unit 3 can be reversed. The electrical drive unit 3 is operated with a defined rated voltage. The same current flows through it and hence also through the current bridge 6. This current is picked up by the motor current detection device 4 and supplied to the squarer 8. As the power loss is proportional to the squared current, and the temperature waveform, which is proportional to the power loss, is available at the output of the integrator (RC filter), the controlled current source 9 and the RC filter define the proportionality factor. In this arrangement, the time constant of the RC filter is matched to the thermal time constant of the current bridge. The temperature measuring device 11 is mounted on the bridge driver 7, for example, and supplies a temperature signal which corresponds approximately to the ambient temperature. By adding this signal, which corresponds approximately to the temperature of the bridge driver, to the voltage available at the output of the RC filter, an absolute measure is obtained for the housing of the power switches which has the greatest load in the current bridge 6. This signal can be fed to an evaluation circuit 12 which, for example, reduces the functions of the current bridge 6 or else turns off the current bridge 6 completely if a preset threshold is exceeded.

Figure 2:
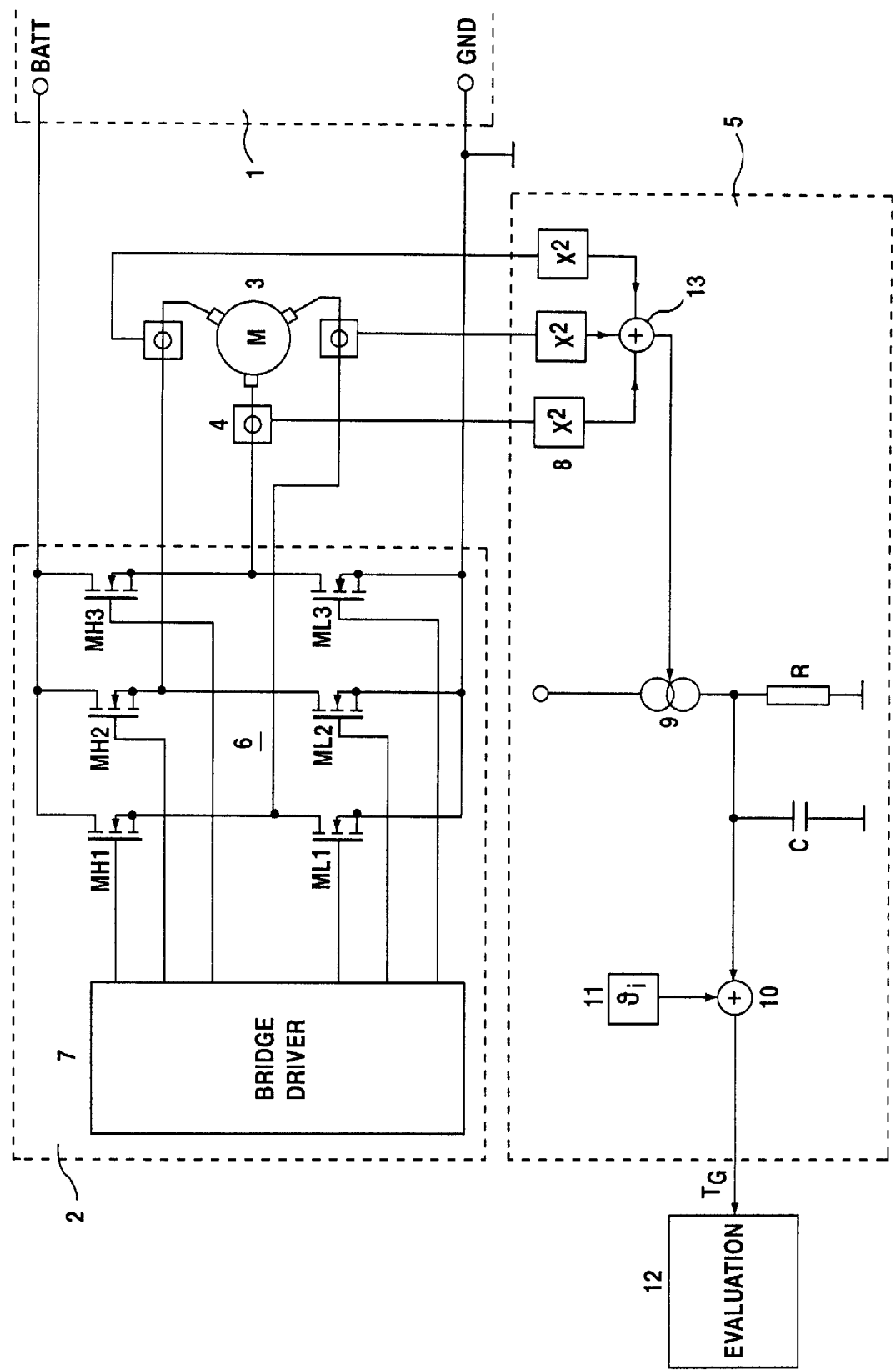
FIG. 2 is a schematic circuit diagram of the invention with an asynchronous motor and motor current detection devices in each current path.

Referring now to FIG. 2, there is shown an exemplary embodiment in which the electrical drive unit 3 is an asynchronous motor. The difference from the exemplary embodiment shown in FIG. 1 is that two further power switches MH3, ML3 are additionally connected in parallel with the existing current bridge 6. The gate connections of the power switches MH3, ML3 are likewise connected to the bridge driver 7. The bridge driver 7 drives the power switches in the current bridge 6 in such a way that voltages whose phases are respectively shifted through 120° are consistently present at the three connections of the asynchronous motor. Each of these three connections of the asynchronous motor is connected to a motor current detection device 4. The motor current values are respectively squared by means of a squarer 8, and the sum of the squares is supplied to the temperature evaluation circuit 5.

Figure 3:
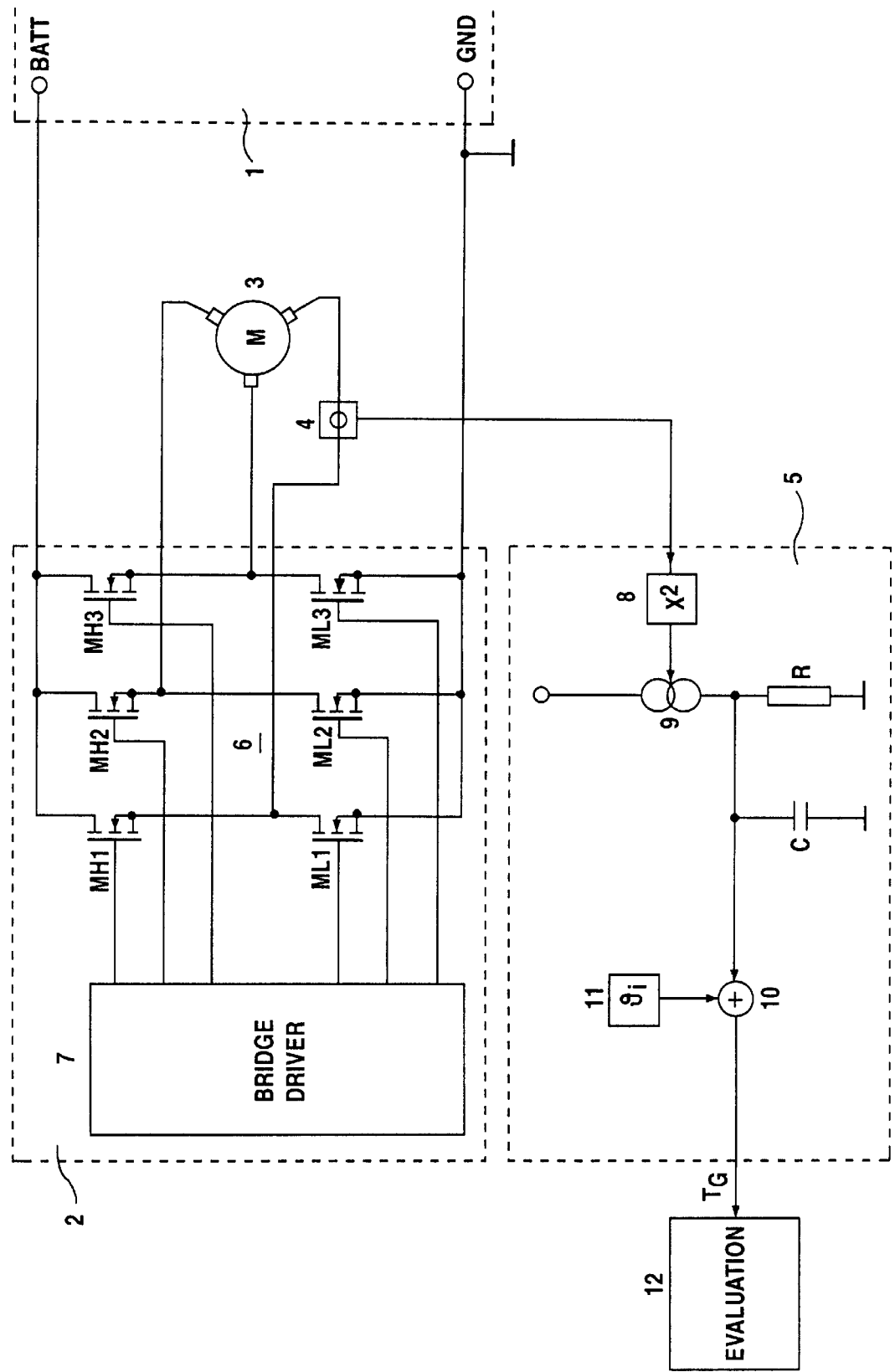
FIG. 3 is a schematic circuit diagram of the invention with an asynchronous motor and a motor current detection device.

Referring now to FIG. 3, there is shown an advantageous refinement of a motor current detection circuit. Since the electrical drive unit 3 rotates in operation, averaged over time, all the half bridges of the current bridge 6 are loaded to the same extent. It is therefore sufficient to install a motor current detection device 4 in one of the three current paths and to detect the motor current value. This motor current value is supplied to the temperature evaluation circuit 5, and the output signal TG, which is dependent on the temperature of the current bridge 6, is supplied to an evaluation circuit 12, which is not described in more detail.

Using the basic circuit diagram of the invention with a DC motor, FIG. 4 shows a particularly advantageous detection circuit for the motor current which can be configured as a monolithic integrated circuit (FIG. 1). The current is measured with reference to ground using the resistors RS1 and RS2, and the amplifiers V1 and V2. The signal at the changeover contact of the changeover switch 43 is a reflection of the motor current. Freewheeling during pulsed operation and during braking operation of the motor takes place via the third and fourth MOSFETs ML1, ML2. In this arrangement, the source connection of the third MOSFET ML1 is connected to one input of the amplifier V1 and to the resistor RS1. The second input of the amplifier V1 is connected to the negative pole of the voltage source 1. The source connection of the fourth MOSFET is connected to one input of the second amplifier V2 and to the resistor RS2. The second input of the amplifier V2 is connected to the negative pole of the voltage source 1, in the same way as the two other connections of the resistors RS1 and RS2 are connected to the negative pole. The outputs of the amplifiers V1 and V2 are respectively connected to one contact of a changeover switch 43. The setting of the changeover switch 43 is defined by the output of a flipflop 41. The R-input of the flipflop 41 is connected to the gate connection of the third MOSFET ML1, whilst the S-connection of the flipflop 41 is connected to the gate connection of the fourth MOSFET ML2. The signal present at the changeover contact of the changeover switch 43 is a reflection of the motor current. This current is supplied to the temperature evaluation circuit according to the invention.

The common feature of all the exemplary embodiments is that, in an advantageous configuration, the functions of the squarer 8, of the controlled current source 9, of the adder 10, and the temperature detection unit 11 of the driver 7 can be designed as a monolithic integrated circuit.

It is also conceivable for the motor current value to be supplied to a, for example, software-controlled computer which then performs squaring of the motor current value, integration of the squared variable, and addition, to the integral, of a variable which is dependent on the ambient temperature, and supplies the temperature-dependent output signal to an evaluation circuit for further processing.

I claim:

1. A circuit configuration for driving an electrical drive unit, comprising:
    a control circuit through which a current is supplied to the electrical drive unit, said control circuit having a current bridge and a bridge driver connected to said current bridge; and
    a temperature evaluation circuit determining from the current supplied to the electrical drive unit a temperature of said current bridge and outputting a temperature-dependent output signal, said temperature evaluation circuit including a squarer, an adder and an RC filter having a time constant equal to a thermal time constant of said control circuit, said temperature evaluation circuit being connected to receive a motor current value of the electrical drive unit, the temperature-dependent output signal being formed by squaring the motor current value with the squarer to form a square of the motor current, integrating the square of the motor current with said RC filter to form an integral, and adder, to the integral a variable dependent on an ambient temperature.

2. The control circuit according to claim 1, wherein said control circuit comprises a plurality of current bridges and a driver for driving said plurality of current bridges.

3. The control circuit according to claim 1, wherein said control circuit is a monolithic integrated circuit.

4. The control circuit according to claim 1, wherein the electrical drive unit is a DC motor.

5. The control circuit according to claim 1, wherein the electrical drive unit is an asynchronous motor.

6. The circuit configuration according to claim 1, which further comprises temperature measuring device for measuring an ambient temperature.

7. The circuit configuration according to claim 6, where said temperature measuring device is included in said bridge driver.

8. The circuit configuration according to claim 1, wherein said temperature evaluation circuit is a monolithically integrated circuit.

9. The circuit configuration according to claim 1, which comprises a motor current detection device for determining the motor current of the electrical drive unit, said motor current detection device including resistors connected in bridge paths of said current bridge.

10. A method of monitoring a temperature of power switches in a current bridge driving an electrical drive unit, which comprises:
    determining a motor current value of the electrical drive unit;
    squaring the motor current value for forming a squared motor current value;
    integrating the squared motor current value obtained in the squaring step and forming an integral; and
    adding, to the integral, a variable that is dependent on an ambient temperature.

11. The method according to claim 10, which comprises outputting an output signal to an evaluation unit subsequently to the adding step.

* * * * *